United States Patent [19]

Janssens et al.

[11] 4,269,924
[45] May 26, 1981

[54] PHOTOGRAPHIC MATERIAL SUITED FOR THE PRODUCTION OF MULTICOLOR IMAGES BY MEANS OF DIFFUSION TRANSFER OF COMPLEXED SILVER HALIDE

[75] Inventors: Wilhelmus Janssens, Aarschot; Alphonse Somers, Edegem; Daniël A. Claeys, Mortsel, all of Belgium

[73] Assignee: AGFA-GEVAERT N.V., Mortsel, Belgium

[21] Appl. No.: 6,487

[22] Filed: Jan. 25, 1979

[30] Foreign Application Priority Data

Jan. 27, 1978 [GB] United Kingdom ............... 3434/78

[51] Int. Cl.³ .................... G03C 1/40; G03C 1/10; G03C 1/76
[52] U.S. Cl. .................... 430/214; 430/212; 430/218; 430/505
[58] Field of Search .................... 96/3, 73, 74, 77; 430/214, 218, 212, 505

[56] References Cited

U.S. PATENT DOCUMENTS

| 2,673,800 | 3/1954 | Meevssen et al. ............ 96/3 |
| 3,705,035 | 12/1972 | Vetter et al. ............ 96/3 |
| 3,837,854 | 9/1974 | Waxman et al. ............ 96/74 |
| 3,925,075 | 12/1975 | Wingender et al. ............ 96/29 D |
| 4,036,643 | 7/1977 | Viro et al. ............ 96/77 |
| 4,047,952 | 9/1977 | Pfaff ............ 96/77 |
| 4,047,953 | 9/1977 | Pfaff ............ 96/77 |

FOREIGN PATENT DOCUMENTS 904364 8/1962 United Kingdom ............ 96/3

Primary Examiner—Richard L. Schilling
Attorney, Agent, or Firm—William J. Daniel

[57] ABSTRACT

A photographic material for the production of multicolor images by means of diffusion transfer of complexed silver halide which includes a support having thereon at least three differently spectrally sensitive silver halide emulsion layers that are each sensitive to light of a different additive primary color, associated with each silver halide emulsion layer a silver precipitating layer containing development nuclei and a different dye-releasing compound for producing a subtractive multicolor image, and optionally one or more non-light-sensitive, non dye-releasing water-permeable hydrophilic colloid interlayers. In this material for better color separation the layers are arranged in a special order including the juxtaposition of two of the emulsion layers or separation thereof by layers penetrated by complexed silver halide so that the emulsion layers act as barriers against cross-diffusion.

10 Claims, 1 Drawing Figure

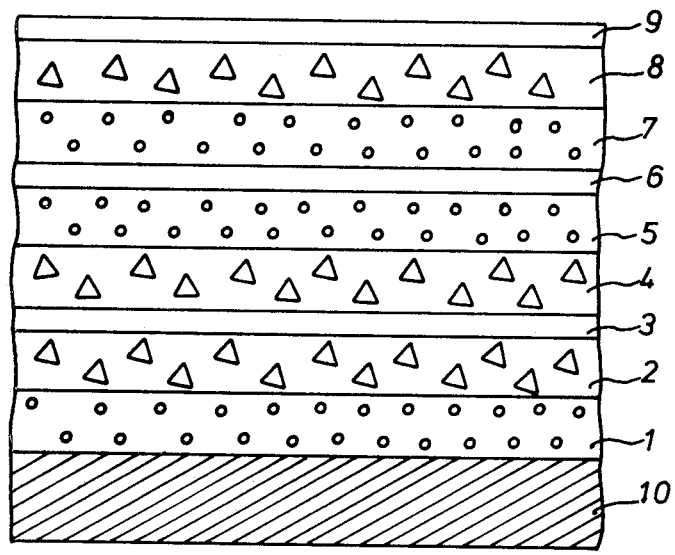

PHOTOGRAPHIC MATERIAL SUITED FOR THE PRODUCTION OF MULTICOLOR IMAGES BY MEANS OF DIFFUSION TRANSFER OF COMPLEXED SILVER HALIDE

The present invention relates to colour diffusion transfer photography and to photographic materials used therein.

Photographic diffusion transfer processes have been known for several years and are summarized e.g. in Imaging Systems by Kurt I. Jacobson and Ralph E. Jacobson (1977) The Focal Press.

Photographic image-transfer processes are based on image formation in a photosensitive image-recording layer and diffusion in an image-wise pattern of at least one substance out of that layer to form an image in an adjacent image-receiving layer and/or to leave an image-wise distributed pattern of transferred substance in the image-receiving layer.

In the generally known black-and-white DTR-process (diffusion transfer reversal process), a silver salt complex is image-wise transferred by diffusion from an image-wise exposed silver halide emulsion layer to an image-receiving material wherein, with the aid of a developing agent and promoted by development nuclei, the silver salt complexes are reduced to silver in a pattern opposite the exposing image.

In diffusion transfer colour processes, an image-dye-providing substance is associated with a silver halide emulsion. An image-dye-providing substance, which provides a positive transferred image in an image-receiving material as a function of development of a conventional negative silver halide emulsion, is referred to as positive-working. Likewise, an image-dye-providing substance which provides a negative transferred image in an image-receiving layer as a function of development of a conventional negative silver halide emulsion, is referred to as negative working.

Dye-diffusion systems operating with photosensitive silver halide can be carried out in a number of ways, but they are all based on the same principle, viz. the alteration in the mobility of a dye or dye-forming structural moiety of a compond controlled by the image-wise reduction of silver compounds to silver.

The image-forming substances used in colour image-transfer processes can therefore be defined as being either initially mobile or initially immobile substances. These terms are generally understood to mean that the image-forming substance is either diffusible or non-diffusible in the photographic element when the latter is permeated with the processing liquid used to carry out the diffusion process. The immobile substances are generally ballasted to provide sufficient immobility in the photographic element when it is imbibed with the processing solution so that these substances will not diffuse substantially from their initial location. A particular class of immobile substances contains compounds that undergo a cleavage or displacement reaction to release a diffusible moiety in an image-wise pattern during the alkaline processing. The formed mobile compounds will diffuse in the photographic element until they are rendered insoluble or immobile in an image-wise pattern in a receptor material.

One class of initially immobile image-dye-providing compounds includes non-diffusible couplers, which release or produce a diffusible dye in proportion to the development of the associated silver halide emulsions by a displacement coupling reaction with an oxidized developing agent.

These initially immobile dye-providing imaging compounds are normally called diffusible dye-releasing compounds (DDR-compounds). The displacement reaction requiring two reagents, the DDR-compound and developing agent, e.g. an aromatic primary amino colour developer or catechol, can proceed in two different ways by using different types of DDR-compounds which are called here type (A) and type (B) compounds. A type (A) compound is a compound with dye-forming moiety e.g. colour coupler comprising a solubilizing group which through a splittable link is bound to a ballasted moiety. A type (B) compound is a compound e.g. a coupler with ballasted moiety which through a splittable link is bound to a dye moiety with solubilizing group. Compounds of both types and a survey of suitable splittable linkages and solubilizing groups are described in the British Patent Specification No. 904,364, filed September 1958 by Kodak Limited. In connection with the type (A) compounds further reference is made, e.g. to the United States Pat. Nos. 3,227,550 of Keith E. Whitmore and Paul M. Mader, issued Jan. 4, 1966 and 3,628,952 of Walter Puschel, Justus Danhauser, Karlheinz Kabitzke, Paul Marx, Arnfried Melzer, Karl-Wilhelm Schranz and Hans Vetter, issued Dec. 21, 1971.

Initially immobile type (B) compounds that release a diffusible image-providing dye inversely proportional to the development of the associated silver halide, are described in the published German Patent Application (DT-OS) No. 2,402,900 filed Jan. 22, 1974 by Eastman Kodak Company and in U.S. Pat. No. 3,980,479 of Donald Lee Fields, Richard Paul Henzel, Philip Thiam Shin Lau, and Richard Allan Charman, issued Sept. 14, 1976.

A special class of such initially immobile dye-releasing compounds generating a diffusible dye comprises compounds that undergo a cleavage reaction following oxidation such as those described in British Patent Specification No. 1,405,662 filed Aug. 31, 1972 by Eastman Kodak Company and the U.S. Pat. Nos. 3,698,897 of Thomas E. Gompf and Kin Kwong Lum, issued Oct. 17, 1972; 3,725,062 of Albert E. Anderson and Kin Kwong Lum, issued Apr. 3, 1973 and 3,728,113 of Richard W. Becker, John A. Ford, Jr., Donald L. Fields and Delbert D. Reynolds, issued Apr. 17, 1973.

Still another class of initially immobile dye-releasing compounds producing a diffusible dye comprises compounds that involve a redox or coupling reaction with an oxidized developing agent and an intramolecular ring-closure reaction as described, e.g., in the U.S. Pat. Nos. 3,443,939 of Stanley M. Bloom and Robert K. Stephens and 3,443,940 of Stanley M. Bloom and Howard G. Rogers, both issued May 13, 1969.

According to the U.S. Pat. No. 3,929,760 of Richard A. Landholm, Jan R. Haase and James J. Krutak Sr., issued Dec. 30, 1975, preferred immobile dye-releasing compounds of the class of type (B) compounds correspond to the following general formula:

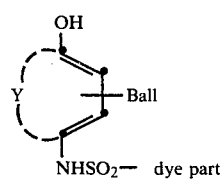

wherein Ball represents an organic ballasting group of such size and configuration as to render the compound non-diffusible during development in the alkaline processing composition, the —NHSO$_2$— is the group being split off together with the dye part on development, and Y represents the carbon atoms necessary to complete a benzene or naphthalene nucleus including substituted benzene or naphthalene. When Y represents the atoms necessary to complete a naphthalene nucleus, Ball can be attached to either ring thereof.

According to the published German Patent Application (DT-OS) No. 2,505,248 filed Feb. 7, 1975 by Agfa-Gevaert AG, the above naphthalene nucleus may be replaced by an indole nucleus whereto the dye part of the molecule is attached through the —NHSO$_2$— group in the 3-position of the indole nucleus.

In image-transfer processes, which require a reversing mechanism in order to obtain a positive transfer image, a direct reversal emulsion can be used but likewise a silver complex DTR-process as described, e.g., in British Patent Specification No. 904,364 filed Sept. 11, 1958 by Kodak Limited, at page 19 lines 1-41 can be employed. In such process a light-sensitive material is employed having a support, a silver-precipitating layer containing development nuclei such as colloidal silver or silver sulphide and a coupler capable of forming a soluble dye with oxidized colour developing agent, and next to this layer an emulsion layer containing silver halide. Upon development of the exposed material with a developer solution containing silver halide solvent, undeveloped silver halide migrates to the adjoining silver-precipitating layer where the developing agent is oxidized and couples with the non-diffusing coupler therein to form an image-wise distribution of diffusible dye, which then diffuses image-wise to a mordanted reception layer, which has been in contact with the light-sensitive material while development was proceeding. The dye image formed in the reception layer is a positive reproduction of the subject when a negative working silver halide emulsion is used. By using a direct positive emulsion the final dye image is a negative reproduction of the subject.

By using an appropriate number of emulsion layers and silver-precipitating layers the process can be readily adapted for multicolour reproduction as described e.g. in the published German Patent Application (DT-OS) No. 2,619,241 fild Apr. 30, 1976 by Eastman Kodak Co.

A problem encountered in multicolour reproduction wherein a DTR-process is used operating with silver halide emulsion layers that each have an adjacent silver-precipitating layer is correct colour separation. In other words one has to take care that the dissolved silver halide of each silver halide emulsion layer arrives in its properly associated silver-precipitating layer to effect therein the image-wise release of diffusible dye by reaction of a DDR-compound with oxidized developing agent.

Normally the various silver halide emulsion layers of the multicolour film assembly are arranged in the following order: the blue-sensitive silver halide emulsion layer first with respect to the exposure side, followed by its associated silver-precipitating layer containing a yellow dye-releasing compound, then the green-sensitive silver halide emulsion layer followed by its associated silver precipitating layer containing a magenta dye-releasing compound and finally the red-sensitive layer followed by its associated silver-precipitating layer containing a cyan dye-releasing compound.

According to another embodiment in published German Patent Application (DT-OS) No. 2,619,241, mentioned above, the blue-sensitive layer comes first with respect to the exposure side followed by the red-sensitive and green-sensitive layers respectively, each of them being followed by their associated silver-precipitating layer containing a dye-releasing compound as defined above.

It has been established experimentally that the layer arrangements according to these embodiments do not offer a correct colour separation since dye release is not selective enough due to the fact that dissolved, i.e. complexed silver halide from more than one silver halide emulsion layer arrives in the same silver-precipitating layer from which dye release then takes place causing an interimage effect resulting in a false colour reproduction.

The problem of false colour reproduction due to complexed silver halide diffusing to different silver precipitating layers is not only encountered in dye-diffusion transfer processes but also in processes where non diffusible dyes are formed with non-diffusing colour couplers in these silver precipitating layers.

In U.S. Pat. No. 2,673,800 issued Mar. 30, 1954 by Louis Achilles Meeussen and Albert Bellay, the problem is solved by using a non-dye forming barrier layer acting as silver precipitating layer between two successive differently spectrally sensitized silver halide emulsion layers (see FIG. 1). The barrier layer effectively stops complexed silver halide that diffuses in the wrong sense but is the cause of a loss of developable silver complex in the dye image formation.

In U.S. Pat. No. 3,837,854 issued Sept. 24, 1974 by Burton Harvey Waxman, Robert Thomas Shannahan and Felix Viro, the problem of colour falsification is solved by sandwiching the silver halide emulsion layer in the middle of a set of three differently spectrally sensitized silver halide emulsion between two identical development nuclei and colour former containing colloid layers. Such arrangement requires the coating of an extra silver precipitating layer.

According to the present invention the undesirable interimage effect is considerably reduced or eliminated without the disadvantages of the prior art solutions.

The present invention provides a photographic multicolour material by means of which through the silver complex diffusion transfer process a better multicolour reproduction can be obtained.

The photographic multicolour material according to the present invention comprises a support having thereon at least three differently spectrally sensitive silver halide emulsion layers that are each sensitive to light of a different additive primary colour, associated with each silver halide emulsion layer a silver-precipitating layer containing development nuclei and a different dye or dye precursor releasing compound for producing a subtractive multicolour image, and optionally one or more non-light-sensitive, non dye releasing water-permeable hydrophilic colloid interlayers, wherein (1) each of the silver halide emulsion layers is at one side contiguous to its associated silver precipitating layer containing a dye or dye precursor releasing compound but at the opposite side not contiguous to another silver precipitating layer containing a dye or dye precursor releasing compound, (2) two of said differently spectrally sensitive silver halide emulsion layers are arranged in contiguous relationship or are arranged with a non-silver-precipitating interlayer in between them, and two of said silver-precipitating layers containing different dye releasing compounds are arranged in contiguous relationship or are arranged with a said non-dye-releasing interlayer in between them, and (3) each of the silver halide emulsion layers contains a diffusion-resistant i.e. non-diffusing silver halide deveoping agent e.g. balck-and-white developing agent.

In the photographic material of the present invention each silver halide emulsion layer is associated with only one silver precipitating layer and in the dye image formation silver is very economically used for it has been established experimentally and proved by the very good colour fidelity that two developed neighbouring silver halide emulsion layers being immediately adjacent or optionally only separated by a non-silver precipitating hydrophilic colloid layer act for each other as a barrier layer for complexed silver halide originating from the neighbouring silver halide emulsion layer.

According to a preferred embodiment the multicolour material of the present invention comprises silver halide emulsion layers and silver precipitating layers in the following order starting from the side remote from the support:

(1) a blue-sensitive silver halide emulsion layer comprising a diffusion-resistant developing agent, (2) a silver-precipitating layer containing development nuclei and a yellow dye-releasing compound, (3) a silver-precipitating layer containing development nuclei and a shifted cyan due-releasing compound, (4) a red-sensitive silver halide emulsion layer comprising a diffusion-resistant developing agent, (5) a green-sensitive silver halide emulsion layer comprising a diffusion-resistant developing agent, (6) a silver-precipitating layer containing development nuclei and a magenta dye-releasing compound, and (7) a support.

The accompanying FIGURE represents a cross-sectional view of a multicolour photographic material according to the invention.

According to a preferred mode of the present invention illustrated in the drawing a hydrophilic water-permeable colloid layer containing a diffusion-resistant developing agent is present between each pair of layers consisting of a silver halide emulsion layer and its associated silver-precipitating layer.

In the drawing, which relates to a cross-sectional view of a preferred multicolour photographic material according to the present invention, element 9 represents a waterpermeable antistress layer, e.g. based on gelatin, element 8 is a blue-sensitive silver halide emulsion layer containing a diffusion resistant developing agent, element 7 is a silver-precipitating layer containing development nuclei and a yellow dye-releasing compound, element 6 is a hydrophilic colloid interlayer, element 5 is a silver-precipitating layer containing development nuclei and a shifted cyan dye-releasing compound, which preferably has before coupling a yellow colour, element 4 is a red-sensitive silver halide emulsion layer containing a diffusion resistant developing agent, element 3 is a hydrophilic colloid interlayer, element 2 is a green-sensitive silver halide emulsion layer containing a diffusion resistant developing agent, element 1 is a silver-precipitating layer containing development nuclei and a magenta dye-releasing compound, and element 10 is a support, e.g. a water-impermeable paper or film support that may be provided at its rearside with an anti-curling layer and may carry one or more subbing layers (not shown in the drawing).

The term "shifted" is used here in the same sense as in the U.S. Pat. No. 3,929,760, already mentioned hereinbefore, for "shifted dye". A shifted dye (here the "dye" is shifted diffusible dye-releasing compound) is a dye that absorbs light outside the range to which the associated silver halide is sensitive. It is preferred to use shifted dyes when the silver precipitating layer precedes in the sense of the direction of exposure its associated silver halide emulsion layer.

To the group of "shifted dyes" belong compounds whose light absorption can be hypsochromically or bathochromically shifted through the influence of the medium in which they are brought, e.g. through the pH and/or oxidation or reduction activity of the medium. For example the colour shift may be the result of a change in the pKa-value of the dye-releasing compound and removal of a group, e.g. hydrolysable acyl group, which is bound to the chromophoric group as described, e.g., in the U.S. Pat. No. 3,260,597 of Stanley R. Scales and Allen E. Wisler, issued July 12, 1966.

The use of a yellow coloured cyan due-releasng compound, i.e. a compound absorbing blue light that could expose the underlying inherently blue-sensitive silver halide emulsion layers is in favour of the sensitivity of the photographic material since a cyan coloured compound would absorb too much of the red light that has to expose the underlying red-sensitive silver halide emulsion layer.

According to a modified embodiment a water-permeable colloid interlayer dyed with a yellow diffusion-resistant dye or Carey Lea Silver is applied between the silver-precipitating layer (7) containing a yellow dye-releasing compound and the silver-precipitating layer (5) containing the cyan dye-releasing compound. It is also possible to dye layers (7) and/or (5) themselves with the diffusion-resistant yellow filter dye or Carey Lea Silver.

According to another embodiment of the present invention likewise operating with a shifted dye-releasing compound, the multicolour material comprises in order from the side remote from the support, a water-permeable antistress layer, a blue-sensitive silver halide emulsion layer containing a diffusion-resistant developing agent, a silver-precipitating layer containing development nuclei and a yellow dye-releasing compound, optionally a water-permeable hydrophilic colloid interlayer, a silver-precipitating layer containing development nuclei and a shifted magenta dye-releasing compound, e.g. such coupler having a yellow colour before coupling, a green-sensitive silver halide emulsion layer containing a diffusion-resistant developing agent, optionally a water-permeable hydrophilic colloid interlayer, a red-sensitive silver halide emulsion layer containing a diffusion-resistant developing agent, a silver-precipitating layer containing development nuclei and a cyan dye-releasing compound, and a support.

The hydrophilic colloid of the interlayers may be gelatin, calcium alginate, or any other colloid as disclosed e.g. in U.S. Pat. No. 3,384,483 of Richard W. Becker, issued May 21, 1968, polymeric materials such as polyvinylamides as disclosed in U.S. Pat. No. 3,421,892 of Lloyd D. Taylor, issued Jan. 14, 1969, or any of those disclosed in French Patent Specification No. 2,028,236 filed Jan. 13, 1970 by Polaroid Corporation or U.S. Pat. Nos. 2,992,104 of Howard C. Haas, issued July 11, 1961; 3,043,692 of Howard C. Haas and Howard G. Rogers, issued July 10, 1962; 3,044,873 of Howard C. Haas, issued July 17, 1962; 3,061,428 of Howard C. Haas, issued Oct. 30, 1962; 3,069,263 and 3,069,264, both of Howard C. Haas, issued Dec. 18, 1962; 3,121,011 of Howard C. Haas and Howard G. Rogers, issued Feb. 11, 1964 and 3,427,158 of David P. Carlson and Jerome L. Reid, issued Feb. 11, 1969.

The present invention includes a process for the production of a photographic transfer image in colour, which process comprises the steps of:

1. exposing the photographic material composed as defined above to a colour light pattern, 2. treating the exposed material containing the diffusion-resistant developing agent with an alkaline aqueous liquid in the presence of a diffusible silver halide developing agent and a silver halide solvent to effect
   (i) the development of each of the exposed silver halide emulsion layers, thereby oxidizing the diffusion resistant developing agent that in oxidized state by its diffusion resistance is not allowed to take part in a reaction with a dye releasing compound, and
   (ii) the dissolution by complex formation of non-developed silver halide to transfer it by diffusion from its silver halide emulsion layer into its associated silver-precipitating layer, 3. forming an image-wise distribution of a released diffusible dye in each silver-precipitating layer by development of the transferred complexed silver halide with the diffusable developing agent in the presence of the development nuclei of the silver-precipitating layer, the diffusable developing agent reacting in its oxidized state with the dye-releasing compounds hereby making the latter compounds release a diffusible dye, and 4. effecting with the alkaline aqueous liquid the diffusion of at least a portion of each of the image-wise distributions of diffusible released dyes to a dye image-receiving layer to provide a colour image in the image-receiving layer.

The diffusion-resistant developing agent, which is operative in the development of the exposed silver halide emulsion layer is excluded from reaction in its oxidized form with a diffusible dye-releasing compound in the silver-precipitating layer because its structure does not allow diffusion out of the emilsion layer.

Examples of such developing agents are diffusion-resistant p-phenylenediamine developing agents as described, e.g., in the U.S. Pat. No. 3,705,035 of Hans Vetter, Justus Danhauser, Karlheinz Kabitzke, Paul Marx, Arnfried Melzer, Willibald Pelz and Walter Puschel, issued Dec. 5, 1972, and black-and-white p-dihydroxybenzene developing compounds containing a ballasting group, e.g. an alkyl substituent comprising in general from 8 to 20 C-atoms. In order to improve the incorporation of such compounds into hydrophilic colloid layers such as gelatin silver halide emulsion layers the benzene nucleus may be substituted with a sulphonic acid group including its salt form.

the diffusible developing agent, which is operative in the physical development (promoted by development nuclei) of the transferred complexed silver halide, is preferably incorporated into the silver-precipitating layers. Preference is given to diffusible developing agents that in oxidized state are capable of cross-oxidizing a non-diffusible dye-compound, which in its oxidized form is capable of releasing a diffusible dye in alkaline medium.

Diffusible developing agents having the capability of cross-oxidizing a dye-releasing compound to make it alkali cleavable and dye releasing are preferably used in conjunction with diffusible dye-releasing compounds that have a $-NHSO_2-$ group which in oxidized form can undergo alkaline hydrolysis to release a diffusible dye as described e.g. in the U.S. published Patent Application Ser. No. B 351,673 filed Apr. 16, 1973 of Lee J. Fleckenstein, published Jan. 28, 1975. Specific examples of such developing agents are hydroquinone, aminophenols (e.g. N-methylaminophenol), 1-phenyl-3-pyrazolidinones e.g. 1-phenyl-4-methyl-3-pyrazolidinone, 1-phenyl-4,4-dimethyl-3-pyrazolidinone, 1-phenyl-4-methyl-4-hydroxymethyl-3-pyrazolidinone, N,N-diethyl-p-phenylenediamine and 3-methyl-N,N-diethyl-p-phenylenediamine. The black-and-white developing agents in this list are preferred in that they have a reduced propensity of staining the dye image-receiving layer.

The diffusible dye-releasing compounds for use according to a preferred embodiment of the present invention are diffusion-resistant. These compounds may be rendered sufficiently diffusion-resistant by properly choosing sufficiently large residues conferring resistance to diffusion.

Residues conferring resistance to diffusion are residues enabling the compounds used in the invention to be incorporated in a diffusion-resistant form into the hydrophilic colloids normally used in photographic materials. The residues used for this purpose are preferably organic residues that generally contain straight-or branched-chain aliphatic groups and may also contain isocyclic or heterocyclic or aromatic groups generally having from 8 to 20 carbon atoms. These residues are attached to the remainder of the molecule either directly or indirectly, e.g. by way of one of the following groups: $-NHCO-$; $-NHSO_2-$; $-NR-$, wherein R represents hydrogen or alkyl; $-O-$; $-S-$ or $-SO_2-$. The diffusion-conferring residue may contain in addition groups that confer water-solubility, e.g. sulpho groups or carboxyl groups; these water-solubilizing groups may also be present in anionic form. Since the diffusion properties depend on the molecular size of the compounds as a whole, it is sufficient in some cases, e.g., when the molecule as a whole is large enough, to use relatively short chain groups as residues conferring resistance to diffusion.

The dye groups may in principle belong to any series of dyes, provided they are sufficiently diffusible to be able to diffuse through the layers of the light-sensitive material to reach the image-receiving layer. For this purpose the dye groups may be provided with one or more water-solubilizing groups. The following, among others, are suitable water-solubilizing groups: carboxyl groups, sulpho groups, sulphonamide or sulphamoyl groups and aliphatic and aromatic hydroxyl groups. The sulphamoyl group left in the dye after the alkaline cleavage of the dye releasing compounds described in the published U.S. Patent Application Ser. No. B 351,673, already mentioned hereinbefore, itself imparts to the dye molecule a considerable tendency to diffusion in an alkaline medium, so that the presence of an additional water-solubilizing group is not always necessary. The following are mentioned as examples of dyes that are particularly suitable for the process according to the invention: azo dyes, azomethine dyes, anthraquinone dyes, phthalocyanine dyes, indigoid dyes, triphenylmethane dyes and metal complex dyes or coloured metal complexes.

Groups of dye precursors are groups of compounds that are converted into dyes by the usual processing steps or by additional steps during the photographic process either by oxidation or by coupling or by liberation of an auxochromic group in a chromophoric system, e.g. by saponification. Dye precursors in this sense may be leuco dyes, couplers, or dyes that are converted into other dyes during photographic processing. Where it is not essential to distinguish in the dye-providing compounds between those releasing a dye and those releasing a dye precursor e.g. leuco compounds and colour couplers, the compounds releasing one of these groups will be simply defined as dye-releasing compounds furtheron.

Suitable diffusible dye-releasing compounds for use in the photographic colour material of the present invention are described, e.g., in the U.K. Patent Specification No. 1,405,662 filed Aug. 31, 1972 by Eastman Kodak Company, the U.S. Pat. Nos. 3,928,312, issued Dec. 23, 1975, 3,993,638 issued Nov. 23, 1976, both of Lee J. Fleckenstein, 3,929,760, U.S. Published Patent Application Ser. No. B 351,673, and the published German Patent Application (DT-OS) No. 2,505,248, all three already mentioned hereinbefore. The reaction scheme of the dye release using a dye-releasing compound with $-NH-SO_2-$ linkage is illustrated in the above mentioned U.S. Published Patent Application Ser. No. B 351,673.

Preferred examples of dye-releasing compunds for use in the present invention correspond to the general formula of the German Patent Application No. 2,645,656 filed Oct. 9, 1976 by Agfa-Gevaert AG, and published on Apr. 13, 1978, viz.:

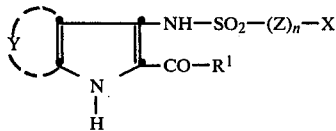

in which

X represents a dye group, which is attached to the $SO_2$ group either directly or by way of an intermediate member Z;

Z represents an alkylene group, with 1 to 6 carbon atoms, arylene or a heterocyclic group which is attached to the residue X either directly or by way of an $-O-$, $-S-$, $-SO_2-$, $-NR-$ (R=hydrogen or alkyl), $-CO-$, $-CO-NH-$ or $-SO_2-NH-$ group; n is 0 or 1;

Y represents the residue to complete a condensed benzene ring including substituted benzene ring;

$R^1$ represents $-OR^2-$, $-S-R^2$ or

$R^2$ represents hydrogen, an alkyl group having from 1 to 22 carbon atoms, a cycloalkyl group or an aryl group; the said alkyl, cycloalkyl and aryl groups may in turn be substituted;

$R^3$ represents one of the residues given under the definition for $R^2$ or an acyl group derived from aliphatic or aromatic carboxylic or sulphonic acids;

$R^4$ represents hydrogen or a substituted or unsubstituted alkyl group e.g. having from 1 to 22 carbon atoms, and in which $R^1$ and/or a substitutent on the condensed benzene ring, which is completed by Y represents or contains a group that confers resistance to diffusion.

Representatives of that general formula can be found in Example 1.

Other dye-releasing compounds suited for use in the multi-color material of the present invention are ballasted hydrazone compounds as described, e.g., in the U.S. Pat. No. 3,628,952 of Walter Puschel, Justus Danhauser, Karlheinz Kabitzke, Paul Marx, Arnfried Melzer, Karl-Wilhelm Schranz, Hans Vetter and Wilibald Pelz, issued Dec. 21, 1971, and representatives of which can be found in Example 2.

The concentration of the dye-releasing compounds in the present photographic material may be varied over a wide range depending upon the particular compound employed and the results desired. The coverage per sq.m is, e.g., in the range of 0.2 g of 2 g.

The dye image-receiving layer can be located on a separate support adapted to be superposed on the photosensitive material after exposure thereof. Such image-receiving materials are generally disclosed for example, in U.S. Pat. No. 3,362,819 of Edwin H. Land, issued Jan. 9, 1969.

According to another embodiment the dye image-receiving layer can also be located integrally with the photosensitive material. According to such an embodiment a transparent support is coated in subsequent order with a dye image-receiving layer, a water-permeable light-reflective layer being opaque or followed by a separate opaque layer and with the photosensitive silver halide emulsion layers and silver-precipitating layers in the already indicated order. The processing composition develops each silver halide layer and dyes are released from the corresponding silver-precipitating layers to provide by diffusion through the opaque reflecting layer a multicolour image, which is viewed through the transparent support on the opaque reflecting layer background. A film unit having an opaque reflecting layer background is described, e.g., in Belgian Patent Specification No. 757,959 filed Oct. 23, 1970 by Eastman Kodak Company.

In an integral film unit containing the light-sensitive layers and image-receiving layer united in one material the opaque layer serves two functions: first, it serves to cover the image silver remaining in the original light-sensitive element after development as well as the dye-providing compounds remaining behind so that when the photographic material is viewed through the transparent support layer of the light-insensitive part, only the positive colour transfer image is visible; second, it shields the light-sensitive element against light from the side of the image-receiving layer (from the bottom). This is particularly important if the monosheet material is to be brought into contact with the alkaline processing substance while still inside the camera after exposure and is then to be pulled out of the camera and developed outside the camera.

Layers that are sufficiently impervious to light but sufficiently permeable to diffusible dyes are water-permeable black pigment layers which may be prepared, e.g., from suspensions of inorganic or organic dark pigments, preferably black pigments, e.g. suspensions of carbon black, in suitable binders, e.g. in gelatin solutions. Layers from 0.5 to 2 μm in thickness containing from 10 to 90% by weight, based on the total dry weight, of carbon black in gelatin are generally sufficient to ensure adequate exclusion of light during development. The particle size of the pigments used is relatively uncritical provided that it does not substantially exceed 0.5 μm.

In addition to the layer of black pigment, the light-impervious layer preferably includes another layer of white pigment arranged underneath the latter. The object of this white pigment layer is to cover the black layer and provide a white background for the image. Any white pigments are suitable for this purpose, provided that they have sufficient covering power in not unduly thick layers. The following are examples: barium sulphate, oxides of zinc, titanium, silicon, aluminium and zirconium, barium stearate and kaolin. The white pigment used is preferably titanium dioxide. The opacifying agents may be dispersed in any binder such as an alkaline solution-permeable polymeric matrix such as, e.g. gelatin, polyvinyl alcohol, and the like. Brightening agents such as the stilbenes, coumarins, triazines and oxazoles can also be added to the light-reflective layer, if desired.

The thickness of the white pigment layer may be varied according to the desired degree of whiteness of the background. Thicknesses of between 5 and 20 μm are preferably employed.

Instead of providing a light-impervious layer in the monosheet material according to the present invention, means for producing such a light impervious layer may be arranged between the light-sensitive element and the image-receiving layer, e.g. in the form of a container or pod arranged at the side of the monosheet material and containing a clouding agent (pigment), which is released when the container is subjected to mechanical forces, and is distributed between the aforesaid layers to form a pigment layer of the kind described above.

The silver halide emulsions used in this invention may comprise, e.g., silver chloride, silver bromide, silver chlorobromide, silver bromoiodide, silver chlorobromoiodide or mixtures thereof. The emulsions may be coarse- or fine-grain and can be prepared by any of the well-known procedures, e.g. single-jet emulsions such as those described in Trivelli and Smith, Photogr. J., Vol. LXXIX, May 1939, pp. 330–338, double-jet emulsions, such as Lippmann emulsions, ammoniacal emulsions, thiocyanate-or thioether-ripened emulsions such as those described in U.S. Pat. Nos. 2,222,264 of Adolph H. Nietz and Frederick J. Russell, issued Nov. 19, 1940; 3,320,069 of Bernard D. Illingsworth, issued May 16, 1967; and 3,271,157 of Clarence E. McBride, issued Sept. 6, 1966. Surface-image emulsions can be used or internal-image emulsions can be used such as those described in U.S. Pat. No. 2,592,250 of Edward Philip Davey and Edward Bowes Knott, issued Apr. 8, 1952; 3,206,313 of Henry D. Porter, Thomas H. James and Wesley G. Lowe, issued Sept. 14, 1965; 3,367,778 of Robert W. Berriman, issued Feb. 6, 1968, and 3,447,927 of Robert E. Bacon and Jean F. Barbier, issued June 3, 1969. The emulsions may be regular-grain emulsions such as those of the type described by Klein and Moisar, J. Phot. Sci., Vol. 12, No. 5, September/October 1964, pp. 242–251. Negative-type emulsions may be used or direct-positive emulsions may be used such as those described in U.S. Pat. Nos. 2,184,013 of John A. Leermakers, issued Dec. 19, 1939; 2,541,472 of William B. Kendall and George D. Hill, issued Feb. 13, 1951; 3,367,778, already mentioned hereinbefore; UK Patent Specification No. 723,019 filed Feb. 5, 1952 by Gevaert Photo-Producten N.V.; French Patent Specification No. 1,520,821 filed Mar. 9, 1967 by Kodak Limited; U.S. Pat. No. 3,501,307 of Bernard D. Illingsworth, issued Mar. 17, 1970; 2,563,785 of Charles F. Ives, issued Aug. 7, 1951; 2,456,953 of Edward Bowes Knott and Guy William Willis, issued Dec. 21, 1948 and 2,861,885 of Edwin H. Land, issued Nov. 25, 1958.

The silver halide emulsions useful in our invention are well-known to those skilled in the art. More details about their composition, preparation and coating are described, e.g., in Product Licensing Index, Vol. 92, December, 1971, publication 9232, p. 107–109.

Generally speaking, the silver halide emulsion layers in the invention comprise photosensitive silver halide dispersed in gelatin and are about 0.2 to 2 μm thick; the dye image-providing materials are dispersed in a polymeric binder permeable to alkaline solutions, such as gelatin, to form a separate layer of about 1 to 7 μm thick; and the polymeric interlayers permeable to alkaline solutions, e.g., gelatin, are about 1 to 5 μm thick. Of course these thicknesses are approximate only and can be modified according to the product desired.

The support for the photographic elements of this invention can be any material as long as it does not deleteriously affect the photographic properties of the film unit and is dimensionally stable. Typical flexible sheet materials are paper supports, e.g. coated at one or both sides with an alpha-olefin polymer, e.g. polyethylene, or include cellulose nitrate film, cellulose acetate film, poly(vinyl acetal) film, polystyrene film, poly(ethylene terephthalate) film, polycarbonate film, poly-α-olefins such as polyethylene and polypropylene film, and related films or resinous materials. The support is usually about 0.05 to 0.15 mm thick.

Any material can be employed as the image-receiving layer in this invention as long as desired function of mordanting or otherwise fixing the dye images will be obtained. The particular material chosen will, of course, depend upon the dye to be mordanted. If acid dyes are to be mordanted, the image-receiving layer can be composed of or contain basic polymeric mordants such as polymers of aminoguanidine derivatives of vinyl methyl ketone such as described in U.S. Pat. No. 2,882,156 of Louis M. Minsk, issued Apr. 14, 1959, and basic polymeric mordants and derivatives, e.g. poly-4-vinylpyridine, the 2-vinyl pyridine polymer metho-p-toluene sulphonate and similar compounds described in U.S. Pat. No. 2,484,430 of Robert H. Sprague and Leslie G. S. Brooker, issued Oct. 11, 1949, the compounds described in the published German Patent Application No. 2,200,063 filed Jan. 11, 1971 by Agfa-Gevaert AG. Suitable mordanting binders include, e.g. guanylhydrazone derivatives of acyl styrene polymers, as described e.g. in published German Patent Specification (DT-OS) No. 2,009,498 filed Feb. 28, 1970 by Agfa-Gevaert AG. In general, however, other binders, e.g. gelatin, would be added to the last-mentioned mordanting binders.

Effective mordanting compositions are long-chain quaternary ammonium or phosphonium compounds or ternary sulphonium compounds, e.g. those described in U.S. Pat. Nos. 3,271,147 of Walter M. Bush and 3,271,148 of Keith E. Whitmore, both issued Sept. 6, 1966, and cetyl-trimethyl-ammonium bromide. Certain metal salts and their hydroxides that form sparingly soluble compounds with the acid dyes may also be used. The dye mordants are dispersed in one of the usual hydrophilic binders in the image-receiving layer, e.g. in gelatin, polyvinylpyrrolidone or partly or completely hydrolysed cellulose esters.

Generally, good results are obtained when the imagereceiving layer, which is preferably permeable to alkaline solution, is transparent and about 4 to about 10 μm thick. This thickness, of course, can be modified depending upon the result desired. The image-receiving layer may also contain ultraviolet-absorbing materials to protect the mordanted dye images from fading due to ultraviolet radiation, brightening agents such as the stilbenes, coumarins, triazines, oxazoles, dye stabilizers such as the chromanols, alkyl-phenols, etc.

Use of pH-lowering material in the dye image-receiving element of a film unit according to the invention will usually increase the stability of the transferred image. Generally, the pH-lowering material will effect a reduction of the pH of the image layer from about 13 or 14 to at least 11 and preferably 5-8 within a short time after imbibition. For example, polymeric acids as disclosed in U.S. Pat. No. 3,362,819 of Edwin H. Land, issued Jan. 9, 1968, or solid acids or metallic salts, e.g., zinc acetate, zinc sulphate, magnesium acetate, etc., as disclosed in U.S. Pat. No. 2,584,030 of Edwin H. Land, issued Jan. 29, 1952, may be employed with good results. Such pH-lowering materials reduce the pH of the film unit after development to terminate development and substantially reduce further dye transfer and thus stabilize the dye image.

An inert timing or spacer layer can be employed in practice over the pH-lowering layer, which "times" or controls the pH reduction as a function of the rate at which alkali diffuses through the inert spacer layer. Examples of such timing layers include gelatin, polyvinyl alcohol or any of those disclosed in U.S. Pat. No. 3,455,686 of Leonard C. Farney, Howard G. Rogers and Richard W. Young, issued July 15, 1969. The timing layer may be effective in evening out the various reaction rates over a wide range of temperatures, e.g., premature pH reduction is prevented when imbibition is effected at temperatures above room temperature, e.g. at 35° to 37° C. The timing layer is usually about 2.5 μm to about 18 μm thick. Especially good results are obtained when the timing layer comprises a hydrolyzable polymer or a mixture of such polymers that are slowly hydrolyzed by the processing composition. Examples of such hydrolyzable polymers include polyvinyl acetate, polyamides, cellulose esters, etc.

The alkaline processing composition employed in this invention is the conventional aqueous solution of an alkaline material, e.g. sodium hydroxide, sodium carbonate or an amine such as diethylamine, preferably possessing a pH beyond 11.

According to an embodiment the alkaline processing liquid contains the diffusible developing agent that effects the reduction of the complexed silver halide, e.g., a 3-pyrazolidinone developing agent such as 1-phenyl-4-methyl-3-pyrazolidinone.

The processing solution, when applied from so-called pods, also preferably contains a viscosity-increasing compound such as a high-molecular-weight polymer, e.g. a water-soluble ether inert to alkaline solutions such as hydroxyethylcellulose or alkali metal salts of carboxymethylcellulose such as sodium carboxymethylcellulose. A concentration of viscosity-increasing compound of about 1 to about 5% by weight of the processing composition is preferred. It will impart thereto a viscosity of about 100 cP to about 200,000 cP.

Processing may proceed in a tray developing unit as is present, e.g., in an ordinary silver complex diffusion transfer apparatus in which the contacting with a separate dye image-receiving material is effected after a sufficient absorption of processing liquid into the photograhic materials has taken place. A suitable apparatus for said purpose is the COPYPROOF CP 38 (trade name) DTR-developing apparatus. COPYPROOF is a trade name of Agfa-Gevaert, Antwerpen/Leverkusen. The present photographic material is especially suited for colour proofing in the graphic art field.

According to other embodiments the processing liquid is applied from a rupturable container or by spraying.

The rupturable container or pod that may be employed in this invention may be of the type disclosed in U.S. Pat. Nos. 2,543,181 of Edwin H. Land, issued Feb. 27, 1951; 2,643,886 of Ulrich L. di Ghilini, issued June 30, 1953; 2,653,732 of Edwin H. Land, issued Sept. 29, 1953; 2,723,051 of William J. McCune Jr., issued Nov. 8, 1955; 3,056,492 and 3,056,491 both of John E. Campbell, issued Oct. 2, 1962 and 3,152,515 of Edwin H. Land, issued Oct. 13, 1964. In general such containers comprise a rectangular sheet of fluid-and air-impervious material folded longitudinally upon itself to form two walls that are sealed to one another along their longitudinal and end margins to form a cavity in which processing solution is contained.

Although the present arrangement of layers in the photographic multicolour material has been described specifically in connection with a dye releasing system operating with imagewise complexed silver halide that has to be reduced to silver in a development nuclei containing layer the same arrangement, with the modification that the development nuclei containing silver precipitating layers are replaced by layers containing photographically inert compounds which undergo cleavage in the presence of imagewise distributed silver ions, can be used offering the same advantages of silver economy and very correct colour rendition. The principles of the latter dye-releasing system and a layer arrangement including silver consuming silver ion scavenger layers are described in U.S. Pat. No. 4,060,417 issued Nov. 29, 1977 by Ronald F. W. Cieciuch, Roberta R. Luhowy, Frank A. Meneghini and Howard G. Rogers. The silver ion scavenger layers become unnecessary by using the present arrangement of layers modified as explained above.

The following examples further illustrate the invention.

EXAMPLE 1

Comparative Test Material A

A subbed water-resistant paper support consisting of a paper sheet of 110 g/sq.m coated at both sides with a polyethylene stratum of 15 g/sq.m was treated with a corona discharge and thereupon coated in the mentioned order with the following layers, the amounts relating to 1 sq.m. of material:

(1) a first silver-precipitating layer containing after drying:

| | | |
|---|---|---|
| silver sulphide nuclei | 0.02 | g |
| 1-phenyl-4-methyl-3-pyrazolidinone | 0.15 | g |
| the magenta dye-releasing compound M1 (structural formula given hereinafter) | 0.80 | g |

-continued

| gelatin | 2 | g |
|---|---|---|

(2) a green-sensitive negative working gelatin-silver chloride emulsion containing 2.5 g of gelatin, 2.7 g of octadecylhydroquinone sulphonic acid and an amount of silver chloride corresponding with 1.1 g of silver;

(3) an interlayer containing 0.6 g of octadecylhydroquinone sulphonic acid and 2 g of gelatin;

(4) a second silver-precipitating layer containing after drying:

| silver sulphide nuclei | 0.02 | g |
|---|---|---|
| 1-phenyl-4-methyl-3-pyrazolidinone | 0.15 | g |
| the inherently yellow coloured cyan dye-releasing compound C1 (structural formula given hereinafter) | 0.80 | g |
| gelatin | 2 | g |

(5) a red-sensitive, negative working gelatin-silver chloride emulsion containing 2.5 g of gelatin, 2.7 g of octadecylhydroquinone sulphonic acid and an amount of silver chloride corresponding with 1.1 g of slver;

(6) an interlayer containing 0.60 g of octadecylhydroquinone sulphonic acid and 2 g of gelatin;

(7) a third silver-precipitating layer containing after drying:

| silver sulphide nuclei | 0.02 | g |
|---|---|---|
| 1-phenyl-4-methyl-3-pyrazolidinone | 0.15 | g |
| the yellow dye-releasing compound Y1 (structural formula given hereinafter) | 0.80 | g |
| gelatin | 2 | g |

(8) a blue-sensitive, negative working gelatin-silver chloride emulsion containing 2.5 g of gelatin, 2.7 g of octadecylhydroquinone sulphonic acid and an amount of silver chloride corresponding with 1.1 g of silver, and (9) an antistress layer containing 2 g of gelatin.

Comparative Test Material B composed according to an embodiment of the present invention The Test Material B contains the above layers (1) to (9) in the order illustrated in the accompanying FIG. 1. This composition is characterized by the face to face relationship of two different silver halide emulsion layers and by the face-to-face relationship of two different silver-precipitating layers.

Exposure and Processing

Samples of both the materials A and B were exposed in an identical way through a graduated density multicolour test unit comprising strips of colour filters on a grey wedge having a constant of 0.1. The absorption of the filter strips was of such wavelength range and density that after exposure through the cyan filter strip the red-sensitive layer was not fogged, by exposure through the magenta filter strip the green-sensitive layer was not fogged, and by exposure through the yellow filter strip the blue-sensitive layer was not fogged.

Besides separate cyan, magenta and yellow filter strips the test unit contained also separate blue, green and red strips so that the exposure proceeded stripwise also with blue, green and red light.

After exposure the photographic materials A and B were dipped for 50 s in a processing liquid having the following composition:

| sodium hydroxide | 30 g |
|---|---|
| hydroxyethylcellulose | 3 g |
| benzyl alcohol | 10 g |
| para-formaldehyde | 1 g |
| anhydrous sodium thiosulphate | 10 g |
| sodium bromide | 2 g |
| water up to | 1 l |

Thereupon the treated materials A and B were contacted with the dye image-receiving material described hereinafter in the COPYPROOF CP 38 (trade name) diffusion transfer processing apparatus containing the same processing liquid as described above. After a contact time of 6 min the dye image-receiving material was peeled off the photographic materials A and B and dried.

Dye Image-Receiving Material

On the same support as described for the above photographic materials a coating having the following composition was applied per sq.m:

| gelatin | 4.5 g |
|---|---|
| triphenyl-n-hexadecylphosphonium bromide | 3 g |

Density Measurement Results

| Reproduced filter selection | Filters | | | | | |
|---|---|---|---|---|---|---|
| | blue | | green | | red | |
| | A | B | A | B | A | B |
| magenta | 0.68 | 0.74 | 1.47 | 1.76 | 0.72 | 0.39 |
| red | 1.36 | 1.68 | 1.52 | 1.93 | 0.69 | 0.47 |
| yellow | 1.08 | 1.08 | 0.31 | 0.29 | 0.27 | 0.23 |
| green | 1.18 | 1.23 | 0.76 | 0.62 | 1.71 | 1.40 |
| cyan | 0.99 | 0.32 | 0.62 | 0.48 | 1.65 | 1.40 |
| blue | 0.95 | 0.76 | 1.55 | 1.79 | 1.65 | 1.36 |

The density measurement was effected with a Macbeth (trade name) densitometer RD-100 R using the following colour filters:

(1) blue Kodak Wratten No. 47
(2) green Kodak Wratten No. 58
(3) red Kodak Wratten No. 25.

These filters manufactured by The Eastman Kodak Company have transmission curves as represented in Handbook of Chemistry and Physics, 56th Edition, Editor Robert C. Weast - CRC Press 18901 Cranwood Parkway, Cleveland, Ohio 44128 USA p. 71, 76 and 64 respectively.

The visual assessment confirmed by the above measured density values reveals that in the colour parts obtained on the receiving material with the photographic material A the red absorption is too high in the magenta and red colour parts whereby magenta is reproduced too blue and red too weak. In the cyan and blue colour parts the blue absorption is too high whereby cyan is reproduced too green and blue to weak.

The image in the dye image-receiving part that had been obtained with photographic material B does not show these defects or shows them much less.

The diffusible dye-releasing compounds Y1, C1 and M1 used in Example 1 have the following structural formulae:

Y1
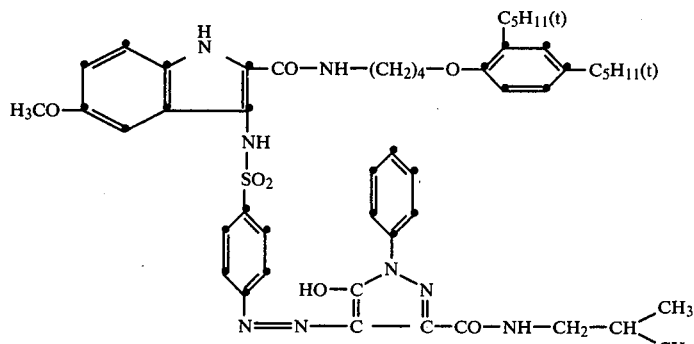

C1
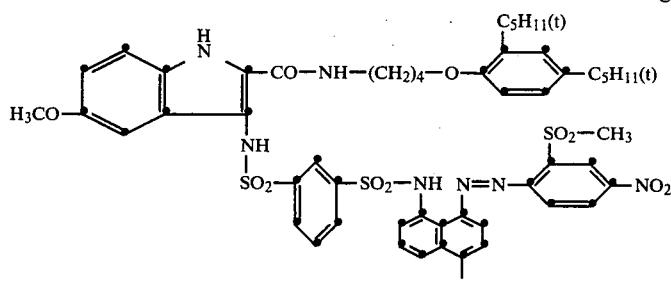

M1
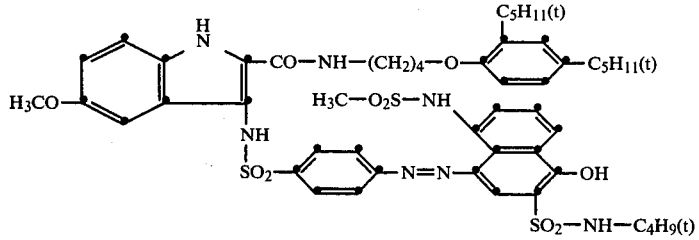

The preparation of the diffusible yellow dye-releasing compound, compound Y1, proceeded as follows:

(1) Preparation of compound A

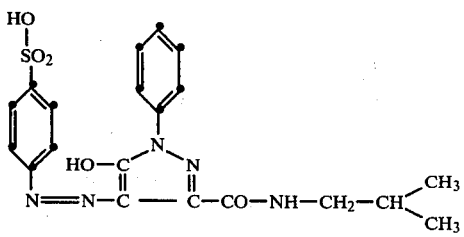

13.2 g of p-sulphanilic acid were mixed with 125 ml of water and to the mixture 20 ml of concentrated hydrochlorid acid were added. At 10°-15° C. 5 g of sodium nitrite dissolved in 20 ml of water were dropwise added within a period of 10 min whilst stirring. Stirring was continued for 30 min and the surplus of nitrous acid decomposed with amidosulphonic acid.

18.5 g of 1-phenyl-5-pyrazolone-3-carboxylic acid ethyl ester were used to make a slurry in 175 ml of water which slurry was added as such to the diazotation mixture.

The pH of the obtained mixture was adjusted to 4 with a 20% by weight aqueous sodium acetate solution and kept at that pH value for 2 h.

Thereupon a sufficient amount of isobutylamine was added to rise the pH to 9 whereafter another 15.9 g of isobutylamine were added. The composition was heated at 80° C. for 1 h, cooled to 20° C., stirred and filtered by suction.

The obtained dye was washed with a 10% by weight aqueous sodium chloride solution and dried. The dye was put into 200 ml of acetone and the mixture stirred for 30 min. The solid left was separated by filtration and first dried in contact with the atmosphere and thereupon at 110° C. for 2 h.

(2) Preparation of compound B: the dye part of the dye releasing compound

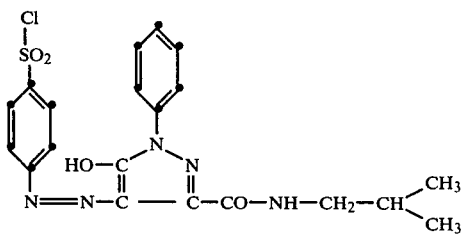

20 g of compound A were mixed by stirring with 100 ml of thionyl chloride. At 10°-15° C. 10 ml of dimethylformamide were added dropwise and stirring was continued at 25° C. for 2 h.

The reaction mixture was poured onto about 800 g of ice, and the solid product formed was separated by suction, washed till neutral with water and dried in the ambient air.

(3) Preparation of compound C

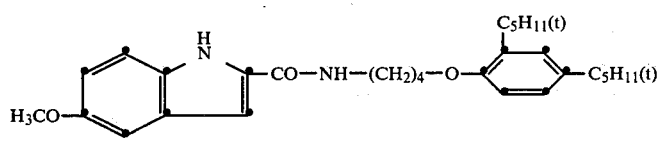

5-methoxyindole-2-carboxylic acid ethyl ester were made to condensate with δ-(2,4-di-t-amylphenyloxy)-butylamine in boiling toluene, whereby ethanol was set free and the above compound C formed.

(4) Preparation of compound D

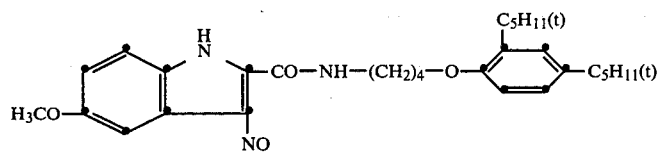

37.2 g of compound C were dissolved in 375 ml of glacial acetic acid with mild heating, cooled to room temperature and added in small portions to 7.6 g of sodium nitrite over a period of 1 h. Stirring was continued for 1 h more and the reaction mixture was then briefly heated to 40° C. to bring the precipitated compound into a form that can be more easily removed by suction filtration. After cooling to 20° C., the mixture was suction filtered and the precipitate was washed, first with glacial acetic acid and then with plenty of water and dried.

(5) Preparation of compound E: the coupler part in the synthesis of the diffusible dye-releasing compound

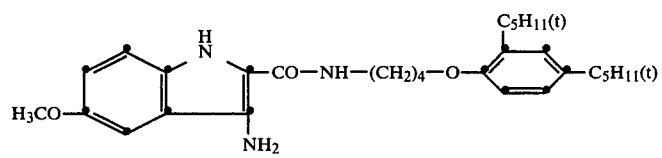

39.6 g of compound D were passed through a fine sieve and vigorously stirred in 370 ml of methanol. A solution of 41 g of sodium dithionite in 165 ml of water was poured all at once to the resulting slurry and the mixture was maintained at 60°-65° C. for 2 h. It was then cooled to 20° C. and the residue was suction filtered, washed with 600 ml of 1% sodium dithionite solution and dried.

(6) Condensation of the compound B with the compound E 4.6 g of compound E were stirred in 50 ml of chloroform. Then 2 ml of pyridine were added, followed by 5.5 g of the sulphochloride B.

The mixture was stirred for 1 h. Then 150 ml of methanol were added and stirring was continued for a further 3 h. The precipitated dye-releasing coupler Y1 was suction filtered. It was purified by dissolving in 50 ml of warm chloroform, adding 100 ml of methanol and leaving the mixture to stand overnight. The compound that crystallised was suction filtered, washed with methanol and dried.

The preparation of the diffusible cyan dye-releasing compound, compound C1, proceeded as follows:

(1) Preparation of compound G

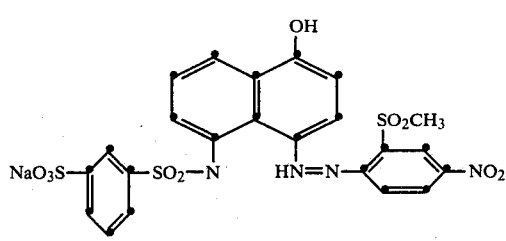

121 g of 3-[5-hydroxy-8-(2-metylsulphonyl-4-nitro-phenylazo)-naphthylsulphamoyl]-benzene sulphonyl-fluoride (prepared according to the published German Patent Application No. 2,402,900 filed Jan. 22, 1974 by Eastman Kodak Company, p.60 Example 6 step 1) were mixed with 2.5 l of water and 28 g of sodium hydroxide.

The reaction mixture was heated at 50° C. for 30 min. After cooling the reaction mixture was neutralized with concentrated hydrochloric acid. The obtained product was salted out with sodium chloride, separated with suction filtering and washed with a little cold water.

(2) Preparation of compound H, the dye part

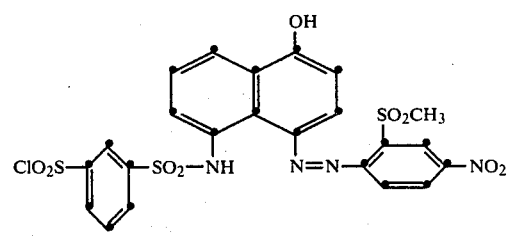

125 g of compound G were mixed by stirring to form a slurry with 700 ml of phosphorus oxychloride. The mixture was heated to 60° C. with continued stirring. At that temperature 20 ml of N-methyl-pyrrolidone were added slowly and stirring was continued at 60° C. for 6 h. After cooling the reaction product was separated by suction filtering, washed with 1,2-dichloroethane and dried. Melting point: >260° C.

(3) The condensation reaction of the dye part (compound H) with the other part (compound B referred to above) forming the cyan dye-releasing compound C1 proceeded as follows:

39.5 g of compound B and 50 g of compound H were mixed by stirring in 400 ml of chloroform.

To the obtained mixture 20 ml of pyridine were added and stirring was continued for 2.5 h. The viscosity of the composition increased. It was heated till boiling for a short period and thereupon cooled. Then 800 ml of methanol were added and stirring was continued for 2 h.

The precipitated dye was separated by suction filtering, washed with 1200 ml of methanol and dried.

The purification of the cyan dye-releasing compound proceeded by mixing 42.5 g of the compound with 425 ml of acetone and refluxing it for 5 min. Then 170 ml of water were introduced whereupon the mixture was boiled again for a short while.

The mixture was cooled to 10° C. and the solid product separated by suction filtering. The product was washed with 425 ml of acetone and 170 ml of water whereupon it was dried.

The preparation of the magenta dye-releasing compound M1, proceeded as follows:

(1) Preparation of compound I

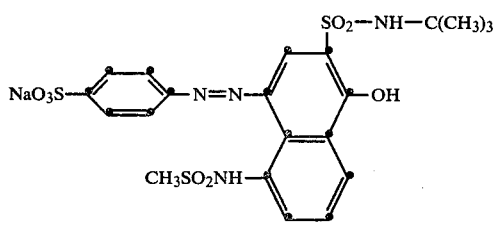

To a solution of 95 g of sulphanilic acid and 29 g of sodium carbonate in 1700 ml of water were added 41 g of sodium nitrite dissolved in 100 ml of water. The obtained solution was added slowly to 115 ml of concentrated hydrochloric acid in 660 g of ice. After 15 min the surplus nitrite was decomposed with urea. The obtained diazotation solution was added to 185 g of 5-methylsulphonamido-1-hydroxy-2-N-t-butyl naphthalene-sulphonamide (prepared according to the published Dutch Patent Application No. 75/01348 filed Feb. 5, 1975 by Eastman Kodak Company, p.38, Example IV, formula 12) and 100 g of sodium hydroxide dissolved in 1750 ml of water. The composition was stirred for 1 h, neutralized with 250 ml of acetic acid and salted out with 500 g of sodium chloride.

The precipitate was separated by suction filtering and washed with a 10% by weight aqueous sodium chloride solution.

Yield after drying : 320 g (still containing 11% by weight of sodium chloride).

(2) Preparation of compound J, the dye part

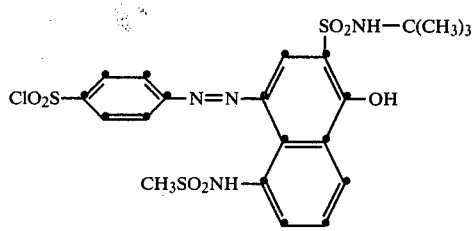

64 g of compound I, 320 ml of phosphorus oxychloride and 13.5 ml of N-methyl-pyrrolidone were stirred at 60° C. for 6 h. The reaction mixture was cooled and the precipitate was separated by suction filtering and washed with 1,2-dichloroethane.

(3) The condensation reaction of the dye part (compound J) with the other part (the above compound B) forming the magenta dye-releasing compound M1, proceeded as follows:

34.5 g of compound B and 40.3 g of compound J were put into a mixture of 175 ml of chloroform and 35 ml of pyridine. The mixture obtained was refluxed for 1 h. To the still hot solution 1000 ml of methanol were added whereupon the mixture was stirred for 20 h. The precipitate formed was separated by suction filtering, washed with 500 ml of methanol and dried.

EXAMPLE 2

Comparative Test Material P

A subbed water-resistant paper support consisting of a paper sheet of 110 g/sq.m coated at both sides with a polyethylene stratum of 15 g/sq.m was treated with a corona discharge and thereupon coated in the mentioned order with the following layers, the amounts relating to 1 sq.m of material:

(1) a first silver-precipitating layer containing after drying:

| | |
|---|---|
| silver sulphide nuclei | 0.02 g |
| 1-phenyl-4-methyl-3-pyrazolidinone | 0.20 g |
| N-dodecyl-N-(4'-sulphobutyl)-3-methyl-p-phenylenediamine | 0.65 g |
| magenta dye-releasing compound M2 (structural formula defined hereinafter) | 0.78 g |
| gelatin | 3 g |

(2) a green-sensitive negative working gelatin-silver chloride emulsion containing 3 g of gelatin, 2.6 g of octadecylhydroquinone sulphonic acid and an amount of silver chloride corresponding with 1.1 g of silver;

(3) a second silver-precipitating layer containing after drying:

| | |
|---|---|
| silver sulphide nuclei | 0.02 g |
| 1-phenyl-4-methyl-3-pyrazolidinone | 0.20 g |
| N-dodecyl-N-(4'-sulphobutyl)-3-methyl-p-phenylenediamine | 0.95 g |
| cyan dye-releasing compound C2 (structural formula defined hereinafter) | 1 g |
| gelatin | 3 g |

(4) a red-sensitive negative working gelatin-silver chloride emulsion containing 3 g of gelatin, 2.6 g of octadecylhydroquinone sulphonic acid and an amount of silver chloride corresponding with 1.1 g of silver;

(5) a third silver precipitating layer containing after drying:

| | |
|---|---|
| silver sulphide nuclei | 0.02 g |
| 1-phenyl-4-methyl-3-pyrazolidinone | 0.20 g |
| N-dodecyl-N-(4'-sulphobutyl)-3-methyl-p-phenylenediamine | 0.95 g |
| yellow dye-releasing compound Y2 (structural formula defined hereinafter) | 1 g |
| gelatin | 3 g |

(6) a blue-sensitive negative working gelatin-silver chloride emulsion containing 3 g of gelatin, 3 g of octadecylhydroquinone sulphonic acid and an amount of silver chloride corresponding with 1.4 g of silver, and (7) an anti-stress layer containing 2 g of gelatin.

Comparative Test Material Q composed according to an embodiment of the present invention The Test Material Q contains the above layers (1) to (7) in the order illustrated in the accompanying FIG. 1 but wherein the interlayers have been left out.

Exposure and Processing

The exposure and processing proceeded in the same way as described in Example 1 with the difference, however, that the following processing composition was used:

| | |
|---|---|
| sodium hydroxide | 15 g |
| hydroxyethylcellulose | 3 g |
| benzyl alcohol | 10 g |
| para-formaldehyde | 1 g |
| anhydrous sodium thiosulphate | 10 g |
| sodium bromide | 1 g |
| water up to | 1 l |

Thereupon the treated materials P and Q were contacted with the image-receiving material of Example 1 in the COPYPROOF CP 38 (trade name) diffusion transfer processing apparatus containing the same processing liquid as described above. After a contact time of 10 min the dye image-receiving material was peeled off the photographic materials P and Q rinsed and dried.

The density measurement was effected as described in Example 1, and the results thereof are listed hereinafter.

| | Filters | | | | | |
|---|---|---|---|---|---|---|
| Reproduced | blue | | green | | red | |
| filter selection | P | Q | P | Q | P | Q |
| magenta | 0.46 | 0.49 | 0.96 | 1.17 | 0.75 | 0.33 |
| red | 0.87 | 0.94 | 1.08 | 1.31 | 0.88 | 0.46 |
| yellow | 0.66 | 0.66 | 0.24 | 0.25 | 0.22 | 0.26 |
| green | 0.93 | 0.92 | 0.42 | 0.62 | 0.86 | 1.40 |
| cyan | 0.65 | 0.34 | 0.34 | 0.44 | 0.66 | 1.01 |
| blue | 0.92 | 0.73 | 1.21 | 1.47 | 0.99 | 1.28 |

As can be learned herefrom in the dye image-receiving material that had been combined with photographic material P the red absorption is too high in the magenta and red colour part whereby the magenta is too blue and the red reproduction too weak.

The blue absorption of the cyan part is too high whereby cyan reproduced with the comparison material P is too green. In the blue image part the blue absorption is too high whereby blue is reproduced too weak.

The image in the dye image-receiving part that had been obtained with photographic material Q does not show these defects or shows them much less.

The diffusible dye-releasing compounds M2, C2 and Y2 used in Example 2 have the following structural formulae:

Compound M2

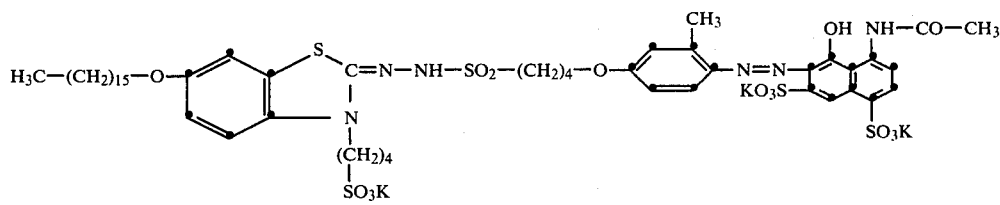

Compound C2

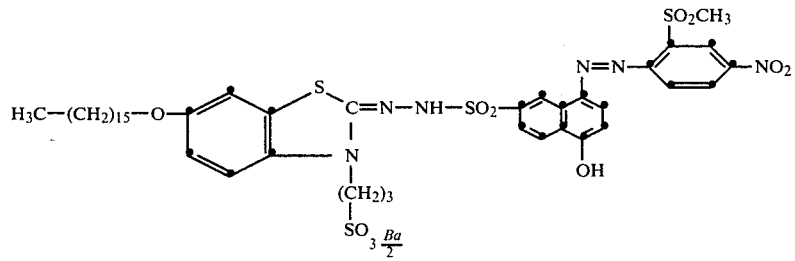

Compound Y2

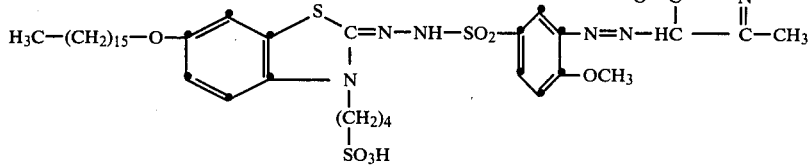

The preparation of the diffusible magenta dye-releasing compound M2 proceeded as follows:

(1) Preparation of compound I:
2-amino-6-hydroxybenzothiazole.

1800 g of 2-amino-6-methoxy-benzothiazole were dissolved in 6 l of a 48% by weight aqueous hydrobromic acid and refluxed. The obtained reaction product was cooled over night and the precipitate was removed by suction filtering. The filtrate was brought at pH 6 with a 30% by weight aqueous hydroxide solution and cooled to 20° C. The obtained precipitate was separated by suction filtering, washed with water and dried at 30° C. Melting point: 257° C. (sublimation).

(2) Preparation of compound II:
2-amino-6-n-hexadecycloxybenzothiazole.

830 g of compound I were mixed with 4 l of isopropanol. To this mixture were successively added 200 g of sodium hydroxide dissolved in 330 ml of water and 1525 g of n-hexadecyl bromide. The reaction mixture was refluxed for 6 h and then cooled by standing overnight. The formed precipitate was separated by suction filtering and stirred to make a slurry with 2 l of methanol. The solid product was washed twice with methanol, separated by suction filtering and washed again with 1 l of water. Melting point: 110° C.

(3) Preparation of compound III:
2-imino-3-δ-sulphobutyl-6-n-hexadecyloxy-benzothiazole.

A slurry consisting of 1170 g of compound II, 1850 ml of dry toluene and 816 g of butanesultone were heated up to reflux (about 120° C. in the reaction mixture) and stirred for 14 h at that temperature. The reaction mixture was then cooled to about 100° C. and 2.7 l of ethanol were added carefully.

The mixture was further cooled to 20° C. whilst stirring and the formed precipitate separated by suction filtering and washed with 2.7 l of ethanol. Melting point: >260° C.

(4) Preparation of compound IV:
3-δ-sulphobutyl-6-n-hexadecyloxybenzothiazole-2-one hydrazone.

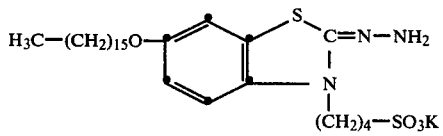

420 g of compound III, 3.2 l of water, 420 ml of ethanol and 420 ml of hydrazine hydrate were stirred and heated up to reflux. The mixture was refluxed for 2 h, and then cooled to 60° C. Thereupon 4 l of ethanol were added whilst stirring and the mixture was cooled to 20° C. The formed precipitate was separated by suction filtering and washed with ethanol. Then this precipitate was stirred with 4.8 l of water and with an aqueous 5 N potassium hydroxide solution hereby bringing the pH at 10. The mixture was heated to 75° C. and kept at that temperature and that pH for 30 min.

Then 4.8 l of methanol were added whilst stirring and the formed precipitate was separated by suction filtering and dried. Melting point: 130° C.

(5) Preparation of compound V:

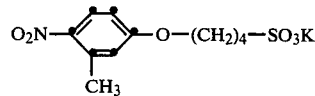

765 g of 4-nitro-m-cresol, 2.5 l of methyl ethyl ketone, 714 g of butane soltone and 362.5 g of potassium carbonate were refluxed for 5 h.

Then 100 ml of concentrated hydrochloric acid were dropwise added to transform the excess of potassium carbonate into potassium chloride.

The reaction mixture was cooled, the precipitate separated by suction and washed twice with 0.5 l of methyl ethyl ketone. The obtained product was dried first in a ventilated stove at 30° C. and subsequently under reduced pressure. Melting point: 192° C.

(6) Preparation of compound VI:

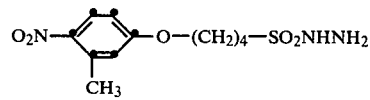

(a) preparation of the sulphochloride corresponding with compound V.

1962 g of compound V, 2160 ml of thionyl chloride and 108 ml of dimethylformamide were stirred at 70° C. for 2 h. The obtained reaction mixture was poured onto 6 kg of ice and the formed hydrochloric acid removed by suction. The precipitate was washed with ice water until free of acid.

(b) preparation of the sulphonyl hydrazide.

4.2 l of ethanol and 750 ml of hydrazine hydrate were stirred in ice and kept at a temperature between 10° and 20° C. The sulphochloride was added portionwise over a period of 3 h. The precipitated sulphonyl hydrazide was separated by suction filtering and washed with water until free of hydrazine. After a further washing with 500 ml of methanol the sulphonyl hydrazide was dried at 30° C. in a ventilated stove.

Melting point: 99° C.

(7) Preparation of compound VII

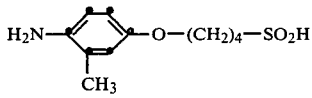

14 l of water, 6.72 kg of cast iron filings and 700 ml of acetic acid were heated to 90° C. Then 3030 g of compound VI were added portionwise (nitrogen evolution and foam formation). The reaction mixture was stirred at 90°–95° C. and 5 N aqueous sodium hydroxide solution was added to bring the pH at 10. Stirring was continued at 90°–95° C. for 1 h. The mixture was filtered while still hot and the filter cake was washed with 5 l of hot alkaline water. The combined filtrates were acidified with 900 ml of concentrated hydrochloric acid up to a pH of 5.5 to 6. The formed precipitate cooled to 20° C. was separated by suction filtering and washed with 4 l of water and 2 l of acetone. The product was dried at 30° C. in a ventilated drying stove. Melting point: 206°–210° C.

(8) Preparation of compound VIII by diazotation and coupling

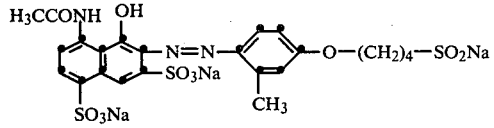

1020 g of compound VII, 6 l of water and ice together with 1200 ml of concentrated hydrochloric acid were stirred and cooled to 5° C. Diazotation was carried out with 296 g of sodium nitrite dissolved in 600 ml of water added over a period of 2.5 h.

The coupling with the obtained diazonium salt was effected with 1620 g of 1-N-acetylamino-8-naphthol-4,6-disulphonic acid disodium salt in 6 l of water in the presence of 1272 g of sodium carbonate. The diazonium salt solution was dropwise added over a period of 2 h. The reaction mixture was stirred at 20° C. for another 2 h whereupon 24 l of acetone were added and 692 ml of acetic acid were dropwise introduced. Hereby carbon dioxide escapes. The mixture was left standing overnight. The formed precipitate was separated by suction filtering and poured in 8 l of 90% by volume of aqueous acetone whilst stirring. After separation by suction filtering the product was dried at 30° C. in a ventilated stove to constant weight.

(9) Condensation reaction for the preparation of compound M2

637 g of compound IV, 830 g of compound VIII, 10 l of water and 150 ml of acetic acid were stirred and heated to 60° C. At 60° C. a solution of 690 g of potassium cyanoferrate(III) in 5 l of water was dropwise added.

1 kg of potassium acetate dissolved in 1 l of water were added together with 8 l of ethanol. The formed precipitate was separated by suction filtering and washed with a 7% by weight aqueous solution of potassium pyrosulphite ($K_2S_2O_5$). The obtained crude coupler product still contains unreacted azo dye and a disulphonyl compound as an impurity which is saponified.

To the crude coupler product dissolved in 10 l of water, first 50 g of potassium pyrosulphite were added at 60° C. and then 350 g of potassium hydroxide dissolved in 1 l of water to reach pH 12. The reaction mixture was kept at 60° C. and pH 12 for 1 h. Thereupon the pH was brought at 7 with 300 ml of acetic acid. Then 10 l of ethanol were added and the mixture cooled. The precipitate was separated by suction filtering and washed with a 7% by weight aqueous solution of potassium pyrosulphite.

Removal of the unreacted azo dye.

The crude product was dissolved in 10 l of water at 60° C. and 50 g of ascorbic acid were added together with 50 g of potassium pyrosulphite. Thereupon 10 l of ethanol were added, the mixture was cooled to 30°–35° C. and the precipitate formed separated by suction filtering. The solid product was washed with 4 l of 5% by weight aqueous potassium pyrosulphite solution.

The preparation of the diffusible cyan dye-releasing compound C2 proceeded as follows:

(1) Preparation of compound IX

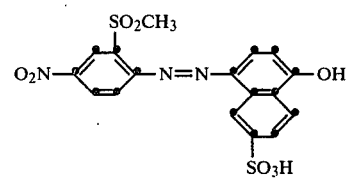

To 2.16 l of 36 N sulphuric acid, 310 g of sodium nitrite were added portionwise taking care to avoid the evolution of nitrous vapours. The mixture was heated to about 50° C. to effect complete dissolution of the nitrite. Thereupon the mixture was cooled to 10° C. whereby sodium hydrogen sulphate precipitated.

At a temperature between 10°–20° C. 1020 g of 2-methylsulphonyl-4-nitroaniline were added portionwise whilst stirring. Stirring was continued for 1 h and the thick slurry poured onto 4.5 kg of ice.

The diazonium salt slurry was added portionwise at 10° C. to a solution of 941 g of 6-sulpho-α-naphthol in 6.5 l of water.

The reaction mixture was stirred for 1 h and allowed to warm up to room temperature. The precipitate was separated by suction filtering and washed with 3 l of acetonitrile. The precipitate was then stirred into a mixture of 7 l of acetonitrile and 210 ml of acetic acid, sucked off and dried.

(2) Preparation of compound X

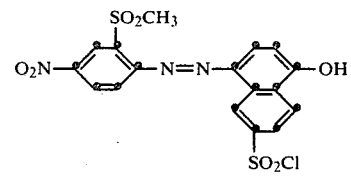

To 960 ml of chlorosulphonic acid 451 g of compound IX were added portionwise whereby the temperature rose to 30°–40° C. The reaction mixture was cooled to 20° C. Then 960 ml of thionyl chloride were dropwise added and the reaction mixture was heated to 60° C. and stirred for 30 min at that temperature. The reaction mixure was cooled to 10° C. and poured onto 10 kg of ice. The formed precipitate was sucked off, washed first with 5 l of water and subsequently with 4 l of methanol.

(3) Condensation reaction for the preparation of compound C2

565 g of 3-γ-sulphopropyl-6-n-hexadecyloxybenzothiazole-2-one hydrazone potassium salt prepared analogously to compound IV were stirred in 18 l of ethyleneglycol monomethyl ether at 45° C. Then 469.5 g of compound X were added portionwise and simultaneously 350 ml of triethanolamine were added dropwise in 2 l of ethyleneglycol monomethyl ether. Thereupon the reaction mixture was stirred at 60° C. for 1.5 h, and admixed first with 6 l of water and then with 875 ml of hydrochloric acid. The precipitate was sucked off, three times washed with 2.5 l of water, and twice mixed by stirring with 7 l of a 80/20 by volume mixture of methanol and water.

The formed precipitate was dissolved in 30 l of water at 60° C. whereupon 60 g of ascorbic acid were added together with 7 l of an aqueous 25% by weight ammonium hydroxide solution.

By adding a solution of 305 g of barium chloride-2-water in 6 l of water a precipitate was formed. The precipitate was separated by suction filtering, washed with water, stirred with 20 l of water, sucked off, washed with 5 l of ethanol and dried.

The precipitate was dissolved at 60° C. in 12 l of dimethylformamide to which 20 g of ascorbic acid had been added. The residue was removed by suction filtering. To the filtrate 20 l of ethanol and 10 l of water were added. The precipitate was sucked off and washed 4 times with 1 l of ethanol and dried. The product was stirred in 3 l of a 98/2 by volume mixture of methylene chloride and methanol, sucked off and dried.

The preparation of the diffusible yellow dye-releasing compound Y2 proceeded as follows:

(1) Preparation of compound XI

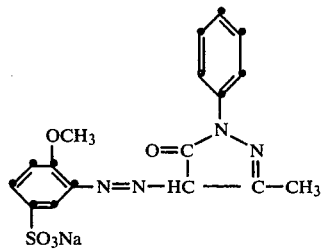

5 l of a mixture of ice and water, 1015 g of 3-amino-4-methoxybenzene sulphonic acid and 1 l of concentrated hydrochloric acid were stirred with ice and cooled to 0° C. To this mixture a solution of 352 g of sodium nitrite in 2 l of water was added dropwise through two dropping funnels whilst keeping the temperature of the diazotation solution between 0° and 5° C. Meanwhile 10 l of water, 1272 g of anhydrous sodium carbonate and 915 g of 1-phenyl-3-methyl-5-pyrazolone were stirred in a stainless steel vessel of 40 l cooled externally with ice.

Within a temperature range of 0° to 15° C. the diazotation solution was added portionwise to the contents of the stainless steel vessel. The reaction mixture was stirred for another 30 min.

The formed precipitate was sucked off and washed with 5% by weight aqueous sodium chloride solution. The precipitate was dried first at 30° C. in a ventilated drying stove and thereupon under reduced pressure.

(2) Preparation of compound XII

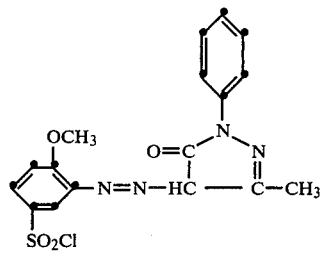

826 g of compound XI were stirred and heated with 826 g of toluene. All traces of water together with a certain volume of toluene distilled till the condensate was clear. A same volume of anhydrous toluene was then added and the solution cooled to 70° C. Then 80 ml of dimethylformamide were added and at 70° C. 580 ml of thionyl chloride were added dropwise over a period of 30 min (slow in the beginning, faster at the end of the addition). The reaction mixture was stirred at 80° C. for another 30 min. The excess of thionyl chloride was removed at 90° C. under moderate reduced pressure. The mixture was then cooled to 25° C. The formed precipitate was sucked off and washed with 1 l of toluene. The obtained product was dried first at 30° C. in a ventilated drying stove and thereupon under reduced pressure.

(3) Condensation reaction for the preparation of compound Y2

18 l of toluene, 1911 g of compound IV and 1398 g of compound XII were stirred and heated to 70° C. To this mixture 420 ml of triethylamine were added dropwise at 70° C. in 1.5 h. Thereupon the reaction mixture was kept at 70° C. for still 1 h. Whilst stirring the reaction mixture was poured into a mixture of 36 l of methanol and 500 ml of 6 N sulphuric acid. The mixture was left standing for 30 min and the formed precipitate separated by suction filtering, washed till neutral with methanol and dried at 30° C. in a ventilated drying stove.

EXAMPLE 3

Comparative Test Material R

A subbed water-resistant paper support consisting of a paper sheet of 110 g/sq.m coated at both sides with a polyethylene stratum of 15 g/sq.m was treated with a corona discharge and thereupon coated in the mentioned order with the following layers, the amounts relating to 1 sq.m of material:

(1) a first silver precipitating layer containing after drying:

| | |
|---|---|
| silver sulphide nuclei | 20 mg |
| 1-phenyl-4-methyl-3-pyrazolidinone | 150 mg |
| magenta dye-releasing compound M3 (structural formula defined hereinafter) | 800 mg |
| gelatin | 2 g |

(2) a green-sensitive negative working gelatin-silver chloride emulsion containing 2.5 g of gelatin, 2.6 g of octadecylhydroquinone sulphonic acid and an amount of silver chloride corresponding with 1.1 g of silver;

(3) an interlayer containing 2 g of gelatin;

(4) a second silver-precipitating layer containing after drying:

| silver sulphide nuclei | 0.02 | g |
| 1-phenyl-4-methyl-3-pyrazolidinone | 0.15 | g |
| cyan dye-releasing compound C3 (structural formula defined hereinafter) | 1 | g |
| gelatin | 2 | g |

(5) a red-sensitive, negative working gelatin-silver chloride emulsion containing 2.5 g of gelatin, 3.1 g of octadecylhydroquinone sulphonic acid and an amount of silver chloride corresponding with 1.3 g of silver;

(6) an interlayer containing 2 g of gelatin;

(7) a third silver-precipitating layer containing after drying:

| silver sulphide nuclei | 0.02 | g |
| 1-phenyl-4-methyl-3-pyrazolidinone | 0.15 | g |
| the yellow dye-releasing compound Y3 (structural formula defined hereinafter) | 1 | g |
| gelatin | 2 | g |

(8) a blue-sensitive, negative working gelatin-silver chloride emulsion containing 2.5 g of gelatin, 3.6 g of octadecylhydroquinone sulphonic acid and an amount of silver chloride corresponding with 1.6 g of silver, and (9) an antistress layer containing 2 g of gelatin.

Comparative Test Material S composed according to an embodiment of the present invention The Test Material S contains the above layers (1) to (9) in the order illustrated in the accompanying FIG. 1. This composition is characterized by the face-to-face relationship of two different silver halide emulsion layers and by the face-to-face relationship of two different silver-precipitating layers.

Exposure and Processing

Samples of both the materials R and S were exposed and processed as described in Example 1.

The visual assessment of the colour parts obtained on the receiving material with the photographic material R learns that the red absorption is too high in the magenta and red colour parts whereby magenta is reproduced too blue and red too weak. In the cyan and blue colour parts the blue absorption is too high whereby cyan is reproduced too green and blue too weak.

The image in the dye image-receiving part that had been obtained with photographic material S shows these defects much less.

Compound M3

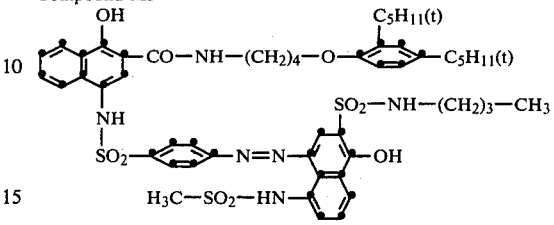

(prepared as described in published Dutch Patent Application No. 75/01348, already mentioned hereinbefore)

Compound C3

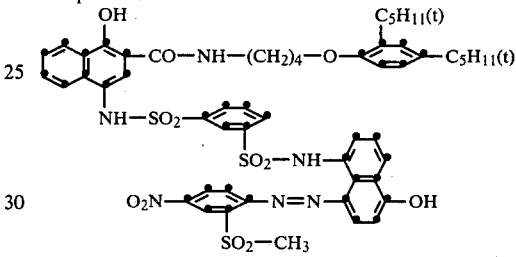

(prepared as described in U.S. Pat. No. 3,929,760, already mentioned hereinbefore)

Compound Y3

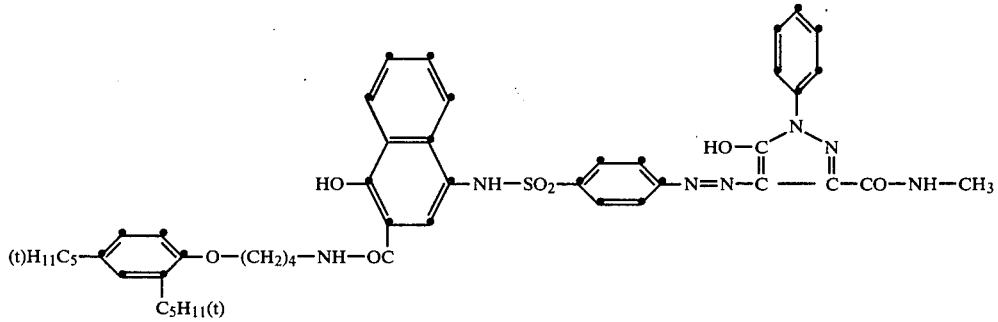

(prepared as described in U.S. Pat. No. 3,929,760, already mentioned hereinbefore).

We claim:

1. A photographic material comprising a support having thereon at least three differently spectrally sensitive silver halide emulsion layers that are each sensitive to light of a different additive primary colour, and associated with each such silver halide emulsion layer a silver-precipitating layer containing development nuclei and a different dye- or dye precursor-releasing compound for producing a subtractive multi-colour image, wherein (1) each of the silver halide emulsion layers is on one side contiguous to its associated silver-precipitating layer but on its opposite side is not contiguous to another such silver precipitating layer, (2) two of said differently spectrally sensitive silver halide emulsion layers are arranged in contiguous relationship or are arranged with an interlayer in between them which is penetrable by diffusing silver complexes, and two of said silver-precipitating layers containing different dye-releasing compounds are arranged in contiguous relationship or are arranged with a non-light-sensitive, non-dye-releasing water-permeable hydrophilic colloid interlayer in between them, and (3) each of the silver halide emulsion layers contains a diffusion-resistant silver halide developing agent.

2. A photographic material according to claim 1, wherein the silver halide emulsion layers and silver-precipitating layers are arranged in the following order starting from the side remote from the support:
   (1) a blue-sensitive silver halide emulsion layer comprising a diffusion-resistant developing agent,
   (2) a silver-precipitating layer containing development nuclei and a yellow dye-releasing compound,
   (3) a silver-precipitating layer containing development nuclei and a shifted cyan dye-releasing compound,
   (4) a red-sensitive silver halide emulsion layer comprising a diffusion-resistant developing agent,
   (5) a green-sensitive silver halide emulsion layer comprising a diffusion-resistant developing agent,
   (6) a silver-precipitating layer containing development nuclei and a magenta dye-releasing compound, and
   (7) a support.

3. A photographic material according to claim 1, wherein the material starting from the side remote of the support comprises a water-permeable antistress layer, a blue-sensitive silver halide emulsion layer containing a diffusion-resistant developing agent, a silver-precipitating layer containing development nuclei and a yellow dye-releasing compound, a water-permeable hydrophilic colloid interlayer, a silver-precipitating layer containing development nuclei and a shifted cyan dye-releasing compound, a red-sensitive silver halide emulsion layer containing a diffusion-resistant developing agent, a water-permeable hydrophilic colloid interlayer, a green-sensitive silver halide emulsion layer containing a diffusion-resistant developing agent, a silver-precipitating layer containing development nuclei and a magenta-dye releasing compound, and a support.

4. A photographic material according to claim 1, wherein the material starting from the side remote from the support comprises a water-permeable antistress layer, a blue-sensitive silver halide emulsion layer containing a diffusion-resistant developing agent, a silver-precipitating layer containing development nuclei and a yellow dye-releasing compound, a silver-precipitating layer containing development nuclei and a shifted magenta dye-releasing compound, a green-sensitive silver halide emulsion layer containing a diffusion-resistant developing agent, a red-sensitive silver halide emulsion layer containing a diffusion-resistant developing agent, a silver-precipitating layer containing development nuclei and a cyan-dye releasing compound, and a support.

5. A photographic material according to claim 1, wherein the support of said material is transparent and said support is coated in subsequent order with a dye image-receiving layer, an opaque water-permeable light-reflecting layer, a water-permeable black pigment layer and the photosensitive silver halide emulsion layers and silver-precipitating layers in the order as defined in claim 1.

6. A photographic material according to claim 5, wherein the dye image receiving layer contains a mordanting agent in a hydrophilic binder.

7. A photographic material according to claim 1, wherein the diffusion-resistant developing agent is a p-dihydroxybenzene compound containing a ballasting group and the benzene nucleus is substituted with a sulphonic acid group.

8. A photographic material according to claim 1, wherein the silver-precipitating layers contain a diffusible silver halide developing agent that in oxidized state is capable of cross-oxidizing a non-diffusible dye-forming compound, which in its oxidized form is capable of releasing a diffusible dye in alkaline medium.

9. A photographic material according to claim 1, wherein the dye-releasing compounds are non-diffusible dye-forming compounds which in their oxidized form are capable of releasing a diffusible dye in alkaline medium.

10. The photographic material of claim 1 wherein each of said silver halide emulsion layers contains as developing agent only a silver halide developing agent which is diffusion resistant in both its initial and oxidized states.

* * * * *